(12) United States Patent
Sakamaki et al.

(10) Patent No.: US 9,542,721 B2
(45) Date of Patent: Jan. 10, 2017

(54) DISPLAY CONTROL DEVICE AND DATA PROCESSING SYSTEM

(71) Applicant: Synaptics Japan GK, Tokyo (JP)

(72) Inventors: Goro Sakamaki, Tokyo (JP); Yosuke Okairi, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 458 days.

(21) Appl. No.: 14/066,679

(22) Filed: Oct. 29, 2013

(65) Prior Publication Data
US 2014/0118406 A1    May 1, 2014

(30) Foreign Application Priority Data

Oct. 30, 2012  (JP) .................................. 2012-239100

(51) Int. Cl.
| | | |
|---|---|---|
| G06T 3/40 | (2006.01) | |
| G09G 5/391 | (2006.01) | |
| G09G 5/395 | (2006.01) | |
| G09G 5/00 | (2006.01) | |

(52) U.S. Cl.
CPC ................. *G06T 3/40* (2013.01); *G09G 5/005* (2013.01); *G09G 5/391* (2013.01); *G09G 5/395* (2013.01); *G09G 2340/0407* (2013.01); *G09G 2360/18* (2013.01)

(58) Field of Classification Search
None
See application file for complete search history.

(56) References Cited

U.S. PATENT DOCUMENTS

| | | | |
|---|---|---|---|
| 2003/0169244 A1 | 9/2003 | Kurokawa et al. | |
| 2006/0001781 A1* | 1/2006 | Uehara | G09G 5/003 348/790 |
| 2006/0012716 A1* | 1/2006 | Choi | G06T 3/606 348/588 |
| 2008/0122855 A1 | 5/2008 | Sonoyama et al. | |

(Continued)

FOREIGN PATENT DOCUMENTS

| | | |
|---|---|---|
| JP | 2003-330433 A | 11/2003 |
| JP | 2006-201805 A | 8/2006 |

(Continued)

OTHER PUBLICATIONS

Office Action issue date Aug. 12, 2016 for related Japanese Application No. 2012-239100.

*Primary Examiner* — James A Thompson
(74) *Attorney, Agent, or Firm* — Miles & Stockbridge P.C.

(57) ABSTRACT

The display control device has a register for holding mode data for giving: a direction about which of a first display mode for performing display control of display data supplied together with a display timing signal from outside, and a second display mode for performing display control of display data written in RAM without accepting supply of a display timing signal from outside to select; and a direction about whether or not to select a scale-up mode for scaling up the display data, so that the mode data can be rewritten from the outside. The display mode is controlled based on the setting values on the register. The control register can be rewritten according to the type of data to be displayed, the system working situation, user settings, etc. Therefore, the low power consumption allowable in terms of system, and a required display performance can be obtained timely and readily.

3 Claims, 7 Drawing Sheets

(56) References Cited

U.S. PATENT DOCUMENTS

| | | | | |
|---|---|---|---|---|
| 2008/0129761 A1* | 6/2008 | Kim | .................. | G09G 3/2096 345/690 |
| 2008/0297544 A1* | 12/2008 | Huang | .................. | G09G 5/005 345/699 |
| 2010/0048253 A1* | 2/2010 | Park | .................. | G06F 1/1613 455/566 |
| 2013/0046967 A1* | 2/2013 | Fullerton | ............. | H03K 3/0315 713/100 |
| 2016/0021381 A1* | 1/2016 | Gault | .................. | A63F 13/10 375/240.25 |

FOREIGN PATENT DOCUMENTS

| | | |
|---|---|---|
| JP | 2006-215320 A | 8/2006 |
| JP | 2008-129557 A | 6/2008 |

\* cited by examiner

| OPERATION MODE | MEMORY OPERATION | APPLICATION OPERATION | TRANSFER OPERATION | LIQUID CRYSTAL CONTROLLER DRIVER | LIQUID CRYSTAL PANEL |
|---|---|---|---|---|---|
| VIDEO MODE (A) | qHD (1/4 FHD) | qHD (1/4 FHD) | qHD (1/4 FHD) LOW SPEED | REAL-TIME SCALING | FHD SCALED UP |
| COMMAND MODE (B) | — | — | — | SCALING VIA MEMORY | FHD SCALED UP |
| VIDEO MODE (C) | FHD | FHD | FHD HIGH SPEED | FHD | FHD |

Fig.7

DISPLAY CONTROL DEVICE AND DATA PROCESSING SYSTEM

CROSS-REFERENCE TO RELATED APPLICATIONS

The Present application claims priority from Japanese application JP 2012-239100 filed on Oct. 30, 2012, the content of which is hereby incorporated by reference into this application.

BACKGROUND

The present invention relates to a display control device and a data processing system, and a technique useful in application to e.g. a liquid crystal controller driver.

In recent years, it has been planed to make the resolution of a compact communication portable terminal device such as a smart phone as high as FHD (full high definition). In regard to FHD, it has been concern that because of the number of pixels as many as 1080×1920, the amount of data to be processed per hour is increased in a display control device operable to perform the display control as well as a host processor, resulting in the considerable increase in electric power in the total system. To decrease the data amount to display resolution, an operation for enlarging a display image may be performed by a scaling technique as described in JP-A-2006-215320.

Further, what is controlled by a display control device is not only video data, such as moving-image data, but also a menu display and graphic data to be drawn by application software. In the former case, video signals supplied together with synchronizing signals are display-controlled in real time. In the latter cases, the display control of display data whose image has been drawn in RAM is performed according to a command issued by a processor. A display control device for performing the display control in these cases is described in JP-A-2008-129557.

SUMMARY

In the case of scaling up data with FHD resolution retained, the high resolution is unworthy in some display applications. For instance, scaling up reduced data for a video image results in the considerable deterioration of image quality. In regard to a still image of a menu display, even if reduced data is scaled up, the deterioration of image quality is unremarkable. But, these are not all. From another viewpoint, in some cases, it is required to put top priority on the action of avoiding an unexpected power source cutoff depending on a factor of a communication portable terminal device or the like, such as the operation status or the extent of battery drain. Further, a display image may be distorted at or near the switching point in the case that a video image display method not including the step of image drawing in RAM is switched to a display method including the step of image drawing in RAM according to a command from a processor. As described above, it has been apparent that options of the display modes and the display operation modes widely vary according to the type of data to be displayed, the system working situation, user's preference, etc. Hence, if such options are selected according to a host-side command, or a method for creating display data, they are poor in usability, and lower power consumption, and required display control performance cannot be achieved timely and easily.

The above and other problems and novel features will be apparent from the description hereof and the accompanying drawings.

Of the embodiments herein disclosed, the representative embodiment will be briefly outlined below.

A display control device has a register for holding mode data for giving: a direction about which of a first display mode for performing display control of display data supplied together with a display timing signal from outside, and a second display mode for performing display control of display data written in RAM without accepting supply of a display timing signal from outside to select; and a direction about whether or not to select a scale-up mode for scaling up the display data, so that the mode data can be rewritten from the outside. The display mode is controlled based on the setting values on the register.

The effect brought about by the representative embodiment herein disclosed will be briefly described below.

That is, the register can be rewritten according to the type of data to be displayed, the system working situation, user settings, etc. Therefore, the low power consumption allowable in terms of system, and a required display performance can be obtained timely and readily.

DETAILED DESCRIPTION

1. Summary of the Embodiments

The representative embodiment will be outlined first. Here, the reference numerals and character strings for reference to the drawings, which are accompanied with paired round brackets, only exemplify what the concepts of members or components referred to by the numerals or character strings contain.

[1]<Controller Operable to Change the Video Mode, the Command Mode, and the Scale-Up Mode>

A display control device (6) has: a first display mode for performing display control of display data supplied together with a display timing signal from outside; a second display mode for performing display control of display data written into RAM (28) without accepting supply of a display timing signal from outside; and a scale-up mode for scaling up the display data. The display control device has: a register for holding mode data for giving a direction about which of the first and second display modes to select and a direction about whether or not to select the scale-up mode, so that the mode data can be rewritten based on a direction from outside; and a control part (23) for controlling the display mode and scale-up based on the mode data held by the register.

According to this embodiment, the register can be rewritten according to the type of data to be displayed, the system working situation, user settings, etc. Therefore, the low power consumption allowable in terms of system, and a required display performance can be obtained timely and readily.

[2]<Mode Transition Control from the First Display Mode to the Second Display Mode>

In the display control device as described in [1], on receipt of a direction for switching to the second display mode during display in the first display mode, the control part stores display data of a frame just before the switching in RAM (P2), and then performs a mode transition to the second display mode while using the stored display data to continue the display.

According to this embodiment, on condition that the first display mode in which real-time display such as video data display is performed is switched to the second display mode in which data and the like subjected to the image drawing in response to a command are displayed, a display screen image can be prevented from being distorted at the time of the mode switching. This is because frame data just before the switching are accumulated in RAM, and used for continuous display at the time of the switching.

[3]<Switching of the First Display Mode to the Second Display Mode with the Current Scaling Mode Maintained>

Figure 4:
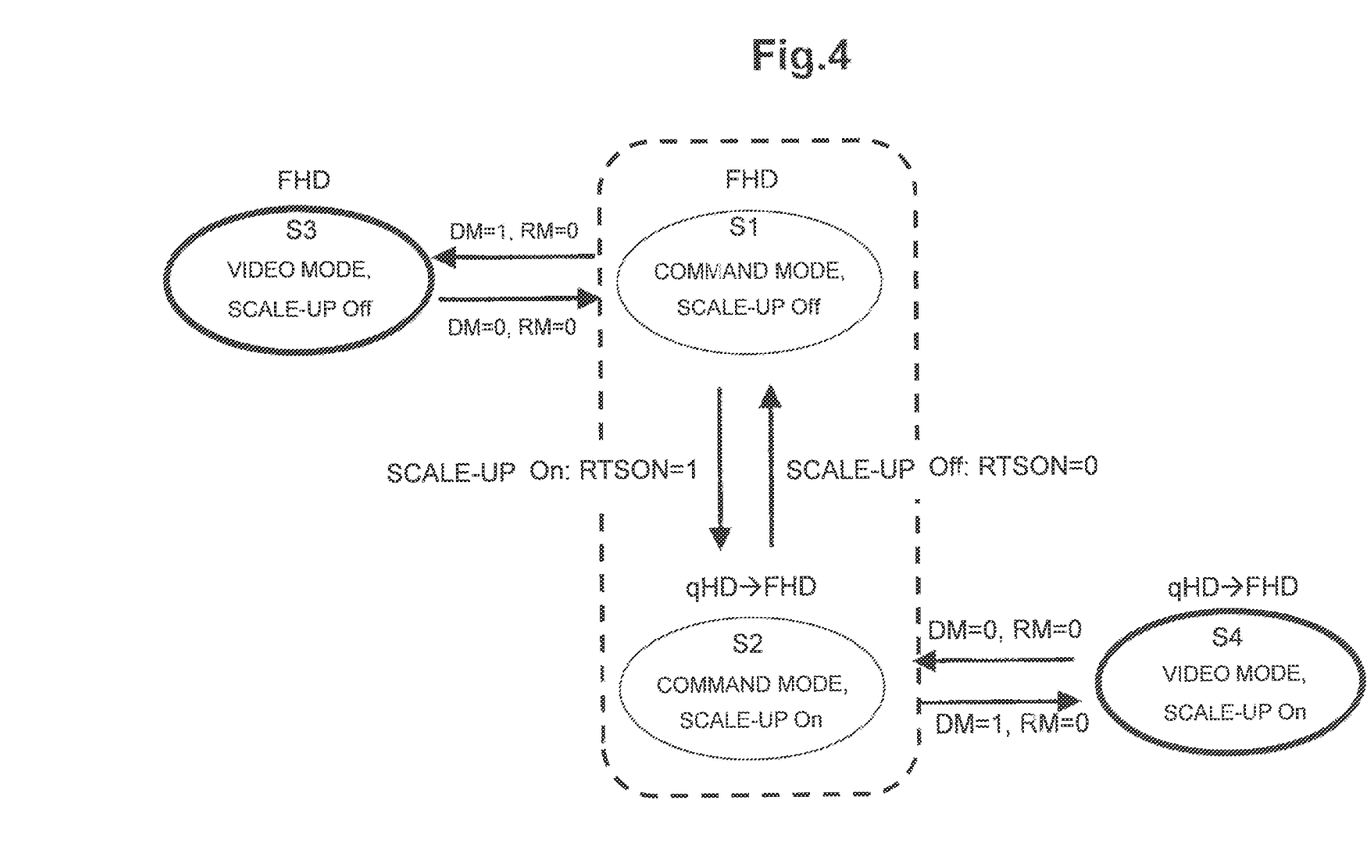
FIG. 4 is a state transition diagram showing, as examples, a display operation and a state transition in a scale-up operation.

In the display control device as described in [2], the control part is arranged to be able to switch the first display mode to the second display mode while maintaining the scale-up mode which remains set currently (between S1 and S3, and between S2 and S4).

According to this embodiment, the scale-up mode remains unchanged at the time of switching between the first and second display modes and therefore, the distortion of a display screen image can be further reduced.

[4]<Control of Switching of the State of Scale-Up being Selected/Unselected in the First Display Mode>

In the display control device as described in [3], when causing a display state to transition between a state in which the first display mode is specified with the scale-up unselected, and a state in which the first display mode is specified with the scale-up selected, the control part causes a transition to the second display mode, and then causes the display state to transition between the states (S4 to S2, and S3 to S1).

According to this embodiment, even if the state of the scale-up is switched in a condition that the display mode has transitioned to the second display mode, and remains the second display mode, the system never goes into the first display mode in which real-time display is performed. On this account, the distortion of a display screen image at the time of changing the scale-up mode can be reduced.

[5]<Hardware Configuration>

Figure 2:
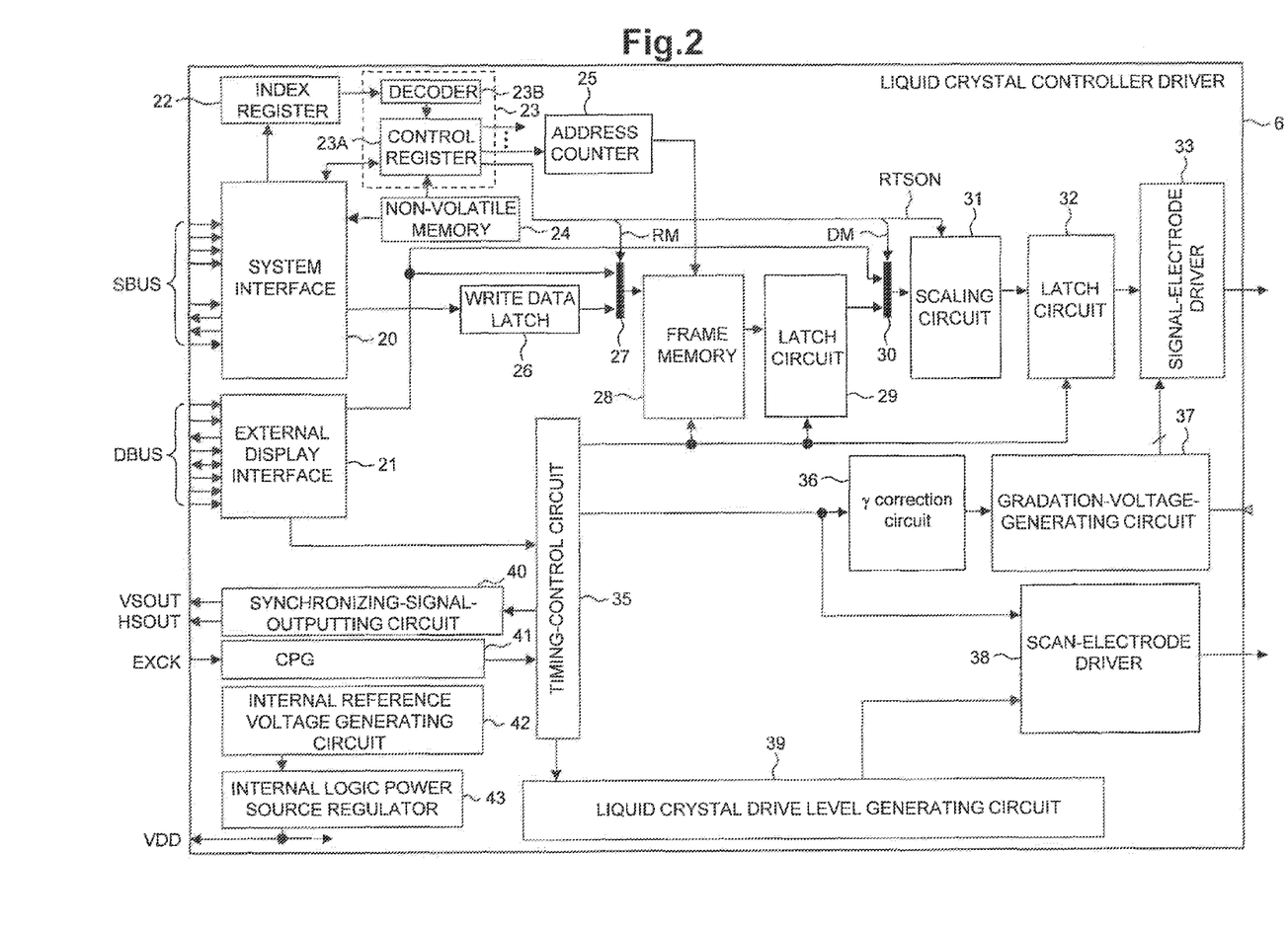
FIG. 2 is a block diagram showing, as an example, the structure of a liquid crystal controller driver.

Further, the display control device as described in [4] has: a first external interface part (21) which is supplied with display data together with a display timing signal from outside; a second interface part (20) which is supplied with display data without supply of a display timing signal from outside; RAM (28) for storing the display data temporarily; and a scaling part (31) for scaling up the display data. The control part controls an operation of selecting, as display data to store in the RAM, one of display data supplied to the first external interface part, and display data supplied to the second external interface part, controls an operation of selecting, as display data to supply to the scaling part, one of display data output by the first external interface part, and display data output from the RAM, and controls an operation of activating the scaling part.

According to this embodiment, use of a minimum number of hardware can readily realize the mode switching as described above.

[6]<System Operable to Change the Video Mode, the Command Mode, and the Scale-Up Mode>

Figure 1:
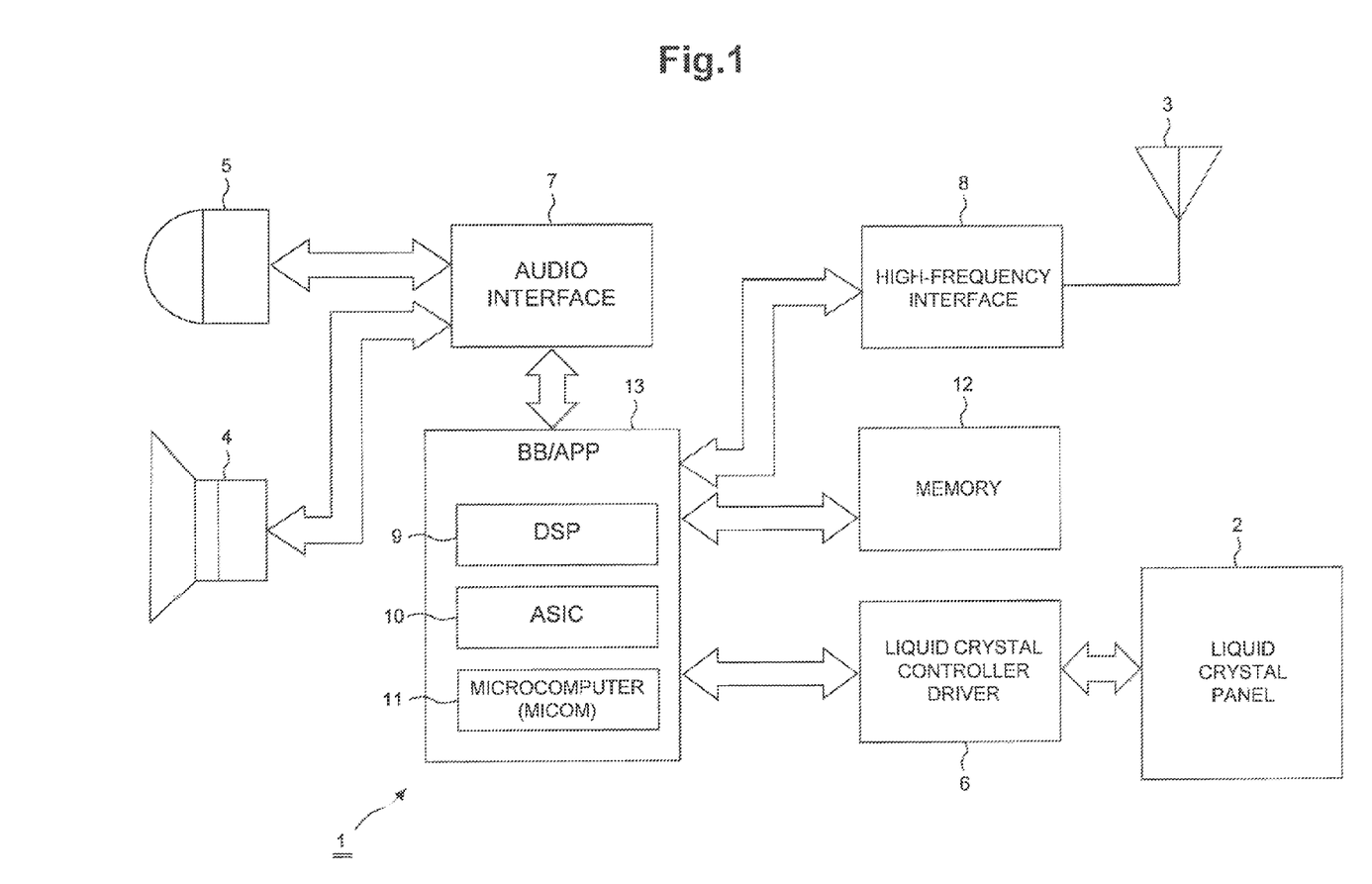
FIG. 1 is a block diagram showing, as an example, the whole structure of a portable terminal device.

A data processing system (1) has: a processor (13) which executes a program; a display control device (6) for performing display control of display data supplied from the processor; and a display device (2) for displaying display data supplied from the display control device. The display control device has: a first display mode for performing display control of display data supplied together with a display timing signal from the processor; a second display mode for performing display control of display data written into RAM (28) without accepting supply of a display timing signal from the processor; and a scale-up mode for scaling up the display data. The display control device includes: a register (22) for holding mode data for giving a direction about which of the first and second display modes to select and a direction about whether or not to select the scale-up mode, so that the mode data can be rewritten based on a direction from outside; and a control part (23) for controlling the display mode and scale-up based on the mode data held by the register.

According to this embodiment, the processor rewrites the register according to the type of data to be displayed, the system working situation, user settings, etc. Therefore, the low power consumption allowable in terms of system, and a required display performance can be obtained timely and readily.

[7]<Mode Transition Control from the First Display Mode to the Second Display Mode>

In the data processing system as described in [6], on receipt of a direction for switching to the second display mode during display in the first display mode, the control part stores display data of a frame just before the switching in RAM (P2), and then performs a mode transition to the second display mode while using the stored display data to continue the display.

The above embodiment brings about the same effect and advantage as those produced by the display control device as described in [2].

[8]<Switching from the First Display Mode to the Second Display Mode with the Current Scale-Up Mode Maintained>

In the data processing system as described in [7], the control part is arranged to be able to switch the first display mode to the second display mode while maintaining the scale-up mode which remains set currently (between S1 and S3, and between S2 and S4).

The above embodiment brings about the same effect and advantage as those produced by the display control device as described in [3].

[9]<Control of Switching of the State of Scale-Up being Selected/Unselected in the First Display Mode>

In the data processing system as described in [8], when causing a display state to transition between a state in which the first display mode is specified with the scale-up unselected, and a state in which the first display mode is specified with the scale-up selected, the control part causes a transition to the second display mode, and then causes the display state to transition between the states (S4 to S2, and S3 to S1).

The above embodiment brings about the same effect and advantage as those produced by the display control device as described in [4].

[10]<Select of the Scale-Up Mode According to a Battery Remaining Amount>

The data processing system as described in [6] further includes a battery as an operating power source. The processor selects the scale-up mode which remains unselected when a remaining amount of the battery reduces below a predetermined value.

This embodiment is suitable for the suppression of unexpected cutoff of the power source.

[11]<Select of the Scale-Up Mode According to a Display Content>

In the data processing system as described in [6], the processor selects the scale-up mode which remains unselected when displaying a menu screen image.

This embodiment contributes to the reduction in electric power because the deterioration of image quality caused by the scale-up of a menu screen image is less remarkable than that in the case of a video image.

[12]<Select of the Scale-Up Mode According to the Power Mode>

In the data processing system as described in [6], the processor selects the scale-up mode remaining unselected when a low-power-consumption mode in which the system works in a low-power consumption condition is set.

According to this embodiment, the display control can be rapidly adapted to the low-power consumption condition of the system.

2. Further Detailed Description of the Embodiments

The embodiments will be described further in detail.

<<Data Processing System>>

FIG. 1 shows, as an example, the whole structure of the portable terminal device. The portable terminal device shown in the drawing is e.g. a portable telephone or a smart phone, which is an example of a data processing system.

A portable terminal device 1 includes: a liquid crystal panel 2 serving as a display part; an antenna 3 for transmission and reception; an audio output speaker 4; an audio input microphone 5; a liquid crystal control driver 6 serving as a display control device; an audio interface 7 for signal input/output to/from the speaker 4 and the microphone 5; and a high-frequency interface 8 for signal input/output to/from the antenna 3. The portable terminal device 1 further includes: DSP (Digital Signal Processor) 9 for processing audio signals and transmit and receive signals; ASIC (Application Specific Integrated Circuits) 10 serving to provide a custom function (user logic); a microprocessor or microcomputer (hereinafter abbreviated to "MICOM") 11 serving as a data processing unit which performs the control of the whole device including display control; and a memory 12 for data storage. The DSP9, ASIC 10 and MICOM 11 constitute a base band-and-application processor part (BB/APP) 13 which controls a communication protocol process and other application processes.

Although no special restriction is intended, the liquid crystal panel 2 is a dot matrix panel of FHD (Full High Definition) having many display pixels arranged like a matrix, and the number of pixels is e.g. 1080×1920. In the case of a liquid crystal panel with a color display, each pixel is constituted by three dots, i.e. red, blue and green ones. Although not particularly shown in the drawing, on condition that a touch sensor panel is adopted as an input device, the touch sensor panel is e.g. an electrostatic capacitance type one and is superposed over a surface of the liquid crystal panel 2. Further, the terminal device has a touch sensor panel controller, which is not shown in the drawing, arranged therein for performing the drive control of the touch sensor panel and a sensing operation. The memory 12 is composed of e.g. a flash memory which can be collectively erased in units of predetermined blocks; during communication control and display control, control data used in a control program executed by MICOM 11, and the communication control and the display control are stored in the memory.

The liquid crystal panel 2 has scan electrodes and signal electrodes arranged like a matrix, and TFT switch is formed at each crossing part of the electrodes (TFT stands for Thin Film Transistor). Each TFT switch has a gate connected with the scan electrode, a drain connected with the signal electrode, and a source connected with a liquid crystal pixel electrode of a liquid crystal capacitance which makes a sub-pixel. The opposite-side electrode of the liquid crystal capacitance is constituted by a common electrode. The signal electrodes are each supplied with a signal voltage output by the display control device driver 6. The liquid crystal controller driver 6 applies a scanning pulse to the gate electrodes e.g. in the order in which the electrodes are arrayed to drive the electrodes.

The liquid crystal controller driver 6 is one embodiment of the display control device, which has as display modes: a video mode in which display data supplied together with display timing in the same way as one-segment TV and videophone images are displayed on the liquid crystal panel 2; and a command mode in which data written by MICOM 11 and the like without any correlation with the display timing are displayed on the liquid crystal panel 2. Further, the liquid crystal controller driver has a scale-up mode, which can select the image display size from among FHD and ¼-FHD. In the scale-up mode, display data of ¼-FHD can be scaled up to FHD size and displayed.

A combination of the audio interface 7, the processor part BB/APP 13, and the memory 12 may be formed in a one-chip semiconductor device of SOC (System On Chip). Further, it is also possible to form a one-chip semiconductor device including the liquid crystal controller driver 6 in addition to the audio interface 7, the processor part BB/APP 13, and the memory 12. The liquid crystal controller driver 6 may be formed as a one-chip semiconductor integrated circuit. Otherwise, they may be formed in one module into which multiple chips of semiconductor devices are arranged, or in multiple chips including the high-frequency interface 8, or a one-chip semiconductor device.

Now, the detail of the display control method in the liquid crystal controller driver 6 will be described below.

<<Liquid Crystal Controller Driver>>

FIG. 2 shows, as an example, the structure of the liquid crystal controller driver 6; the liquid crystal controller driver is one embodiment of a semiconductor integrated circuit for display control. The liquid crystal controller driver 6 serves to drive a dot-matrix type liquid crystal display panel 2. The liquid crystal controller driver 6 has a frame memory 28 as RAM for storing display data to be displayed on the dot-matrix type liquid crystal display panel; the display data are stored in the frame memory 28 according to the bit-map method. The frame memory 28 is composed of e.g. SRAM (Static Random Access Memory).

The liquid crystal controller driver 6 includes a control part 23 for controlling parts or components therein based on an instruction from the processor part BB/APP 13 outside it.

In addition, the liquid crystal controller driver 6 includes: a pulse generator (CPG) 41 which generates a reference clock pulse based on an oscillation signal from the outside or an oscillation signal from a vibrator connected with an external terminal; and a timing control circuit 35 which generates, based on the clock pulse, a timing signal for providing an operation timing of each of various circuits in the chip.

The liquid crystal controller driver 6 further includes: a system interface 20 mainly for exchange of data, such as instruction data, and asynchronous display data (i.e. display data involving no display timing signal) with MICOM 11 of the processor part BB/APP 13 and the like through the system bus SBUS; and an external display interface 21 for receiving synchronous display data involving a display timing signal, e.g. a horizontal synchronizing signal HSYNC or a vertical synchronizing signal VSYNC, moving-image data involving a display timing signal, etc. from ASIC of the processor part BB/APP 13 and the like through the display bus DBUS, which is not shown.

Asynchronous display data entered into the system interface 20 are written into a write data latch 26 e.g. in units like words or long words, and written into the frame memory 28 through a selector 27 in predetermined units. The address for writing to the frame memory 28 is created by an address counter 25 according to a direction from the control circuit 34.

Synchronous display data supplied to the external display interface 21 can be written into the frame memory 28 through the selector 27. The display data written into the frame memory 28 are read and put in a latch circuit 29 in units of display lines. The display data latched by the latch circuit 29 are supplied to a scaling circuit 31 through a selector 30. In addition, synchronous display data provided to the external display interface 21 can be directly supplied to the scaling circuit 31 through the selector 30. The input selection by the selector 27 is determined by the logical value of the control bit RM, whereas the input selection by the selector 30 is determined by the logical value of the control bit DM. The selection about whether to activate or deactivate the scaling circuit 31 depends on the logical value of the control bit RTSON. The control bit RM is characterized as a control bit for designating, as an input to the frame memory 28, data from the side of the system interface 20, or data from the side of the external display interface 21. The control bit DM is characterized as a control bit for designating, as data to be displayed, data whose image was dawn in the frame memory 28 or a real-time input from the side of the external display interface 21.

Although no special restriction is intended, when being activated, the scaling circuit 31 performs an arithmetic calculation process for scaling up, by means of a calculation of interpolation, display data from a quarter (qHD) pixel number to FHD pixel number to a half pixel number in units of pixels in each of vertical and horizontal directions in terms of pixel number scale. When staying nonactivated, the scaling circuit 31 outputs data input thereto as it is.

The display data that the scaling circuit 31 outputs are latched by a latch circuit 32, and then provided to the signal electrode driver 33. The signal electrode driver 33 selects gradation voltages generated by a gradation-voltage-generating circuit 37 according to values of display data supplied from the latch circuit 32, and outputs the signal voltages to the signal electrodes of the liquid crystal panel 2, provided that the selected gradation voltages have been subjected to the correction by a γ correction circuit 36 for correcting the γ characteristic of the liquid crystal panel.

The scan electrode driver 38 sequentially applies a scan voltage generated by the liquid crystal drive-level generating circuit 39 to the scan electrodes of the liquid crystal panel 2, and drives the electrodes while scanning them.

A synchronizing-signal-outputting circuit 40 generates synchronizing signals VSOUT, HSOUT used for driving the signal and scan electrodes of the liquid crystal panel 2; VSOUT denotes a vertical synchronizing signal, and HSOUT denotes a horizontal synchronizing signal.

The reference numeral 42 represents an internal reference voltage generating circuit which generates an internal reference voltage. The numeral 43 represents an internal logic power source regulator which lowers a voltage Vcc, such as 3.3 or 2.5 volts supplied from the outside to produce an internal logic circuit source voltage VDD, such as 1.5 volts.

The control part 23 has a control register 23A and a decoder 23B provided therein; control information for controlling the operation state of the whole chip, including the operation mode of the liquid crystal controller driver 6, is stored in the control register 23A. The reference numeral 22 represents an index register 22 to write index information as a command code for making reference to the control register 23A into. The index information set in the index register 22 is decoded by the decoder 23B. Then, the control information is read out from the control register 23 based on the result of the decoding. For instance, when MICOM 11 writes an index value such as a command code into the index register 22, reference is made to control information in the control register 23A according to the written index value, and then the information is output. The index information is characterized as mode data or command data. The control information referred to by index information includes an initial value set on the address counter 25, values of control bits RM, DM, RTSON, and a start enable signal of the timing control circuit 35. The non-volatile memory 24 holds an initial value of the control register 23A. At the time of power-on reset or system reset, the initial value is initially loaded from the non-volatile memory 24 to the control register 23A according to a direction from MICOM 11. As to the control bits RM, DM, RTSON, for example, combination patterns of their values which are assumable in terms of operation are stored in the control resister 23A so that each of them can be referred to by index information. Incidentally, the control register 23A can be overwritten through the system interface 20 by the external MICOM 11 or the like. For instance, combination patterns of values of the control bits RM, DM, RTSON can be overwritten by MICOM 11 or the like.

According to this, the liquid crystal controller driver 6 performs: an image drawing process for sequentially writing display data into the frame memory 28 based on an instruction and data from MICOM 11 or like which is passed through the system interface 20; and a reading process for periodically reading display data out of the frame memory 28 to output signal voltages to the signal electrodes of the liquid crystal panel 2. Further, the liquid crystal controller driver 6 is capable of outputting a scan voltage to the scan electrodes sequentially. In addition, the liquid crystal controller driver 6 is capable of outputting signal and scan voltages for displaying, on the liquid crystal panel 2, display data supplied together with a display synchronizing signal through the external display interface 21 in real time. In these actions, a scale-up process by use of the scaling circuit 31, the switching between the display control through the system interface, and the display control through the external display interface, and other steps are enabled.

<<Control of Display Mode and Scale-Up Mode>>

The operation modes (display mode) of the liquid crystal controller driver 6 controlling the display on the liquid crystal panel 2 are roughly classified into: a video mode in which display data supplied together with the display timing are displayed on the liquid crystal panel 2; a command mode in which data written by MICOM 11 and the like without any correlation with the display timing are displayed on the liquid crystal panel 2; and a scale-up mode in which 1/4-FHD display data can scaled up to FHD size and displayed. The video mode is an embodiment of the first display mode for performing the display control of display data supplied from the outside together with a display timing signal. The command mode is an embodiment of the second display mode for performing the display control of display data written on RAM with no display timing signal supplied from the outside. The scale-up mode is an operation mode for scaling up the display data.

Mode data for giving a direction about which display mode (the video mode or the command mode) to select and a direction about whether or not to select the scale-up mode is a kind of index information provided to the index register 22 by MICOM 11 or the like. Reference is made to the control register 23A according to this index information, whereby control information including values of the control bits RM, DM, RTSON are taken. According to the control information, the display operation and the scale-up operation are controlled. Although no special restriction is intended, the logical values of the control bits RM, DM are decided depending on whether the display mode is the video mode or the command mode. The logical value of the control bit RTSON is decided depending on whether the scale-up mode is selected or not.

Figure 3:
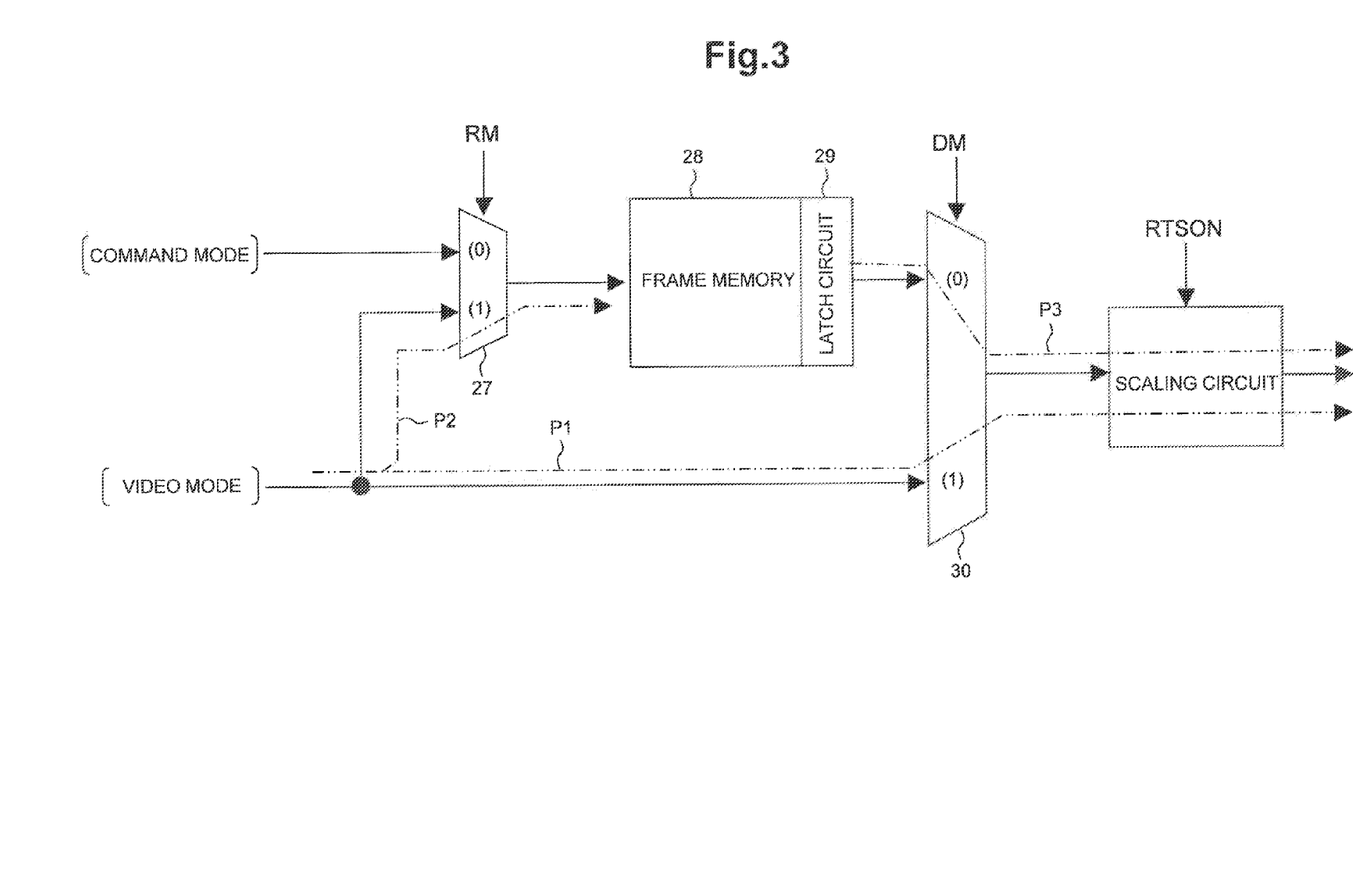
FIG. 3 is an explanatory diagram showing, as an example, the relation between control bits RM, DM serving as control signals and a display mode.

FIG. 3 shows, as an example, the relation of the control bits RM, DM serving as a control signal with the display modes. In FIG. 3, RM=0 means that display data from the side of the system interface 20 are selected, whereas RM=1 means that display data from the side of the external display interface 21 are selected. Further, DM=0 means that display data in the frame memory 28 are selected, whereas DM=1 means that display data from the side of the external display interface 21 are selected.

Although no special restriction is intended, the states of the control bits DM, RM according to the display mode specified by the index information are as follows: RM=0, and DM=1 when the video mode is specified; and RM=0, and DM=0 when the command mode is specified. In the video mode, display data from the side of the system interface 20 can be written in the frame memory 28 in parallel with the display operation thereby. Although no special restriction is intended, the state of scale-up mode data RTSON according to the scale-up mode specified by the index information is as follows: RTSON=1 when the scale-up mode is selected; and RTSON=0 when the scale-up mode is not selected.

<<Control of Transition from the Video Mode to the Command Mode>>

The display mode transition control in the case that a direction for changing the display mode to the command mode is issued from MICOM 11 or the like during display in the video mode will be described. On receipt of a direction for switching to the command mode during display in the video mode, the control part 23 stores display data of the frame just before the switching in the frame memory 28, and then performs the mode transition to the command mode while using the stored display data to continue the display. Specifically, if the command mode is directed by a new index information in a situation that the path P1 as shown in FIG. 3 is used as a path for supplying display data in the video mode, display data of the last display frame in the video mode are first supplied to the frame memory 28 through the path P2 in FIG. 3. Then a path for supplying display data as the path P3 in FIG. 3 is formed, and the display mode is forced to transition to the command mode. Thus, the device is allowed to transfer to the command mode, and to perform the image drawing for the display data of the last frame while displaying the last frame image. As described above, on condition that the video mode in which real-time display such as video data display is performed is switched to the command mode in which data and the like subjected to the image drawing in response to a command are displayed, a display screen image can be prevented from being distorted at the time of the mode switching. This is because frame data just before the switching are accumulated in the frame memory 28, and used for continuous display at the time of the switching.

<<State Transition in the Display Operation and the Scale-Up Operation>>

FIG. 4 shows, as an example, the state transition in the display operation and the scale-up operation.

The state S1 is a display operation state in the command mode with no scale-up selected; S2 is a display operation state in the command mode with the scale-up selected; S3 is a display operation state in the video mode with no scale-up selected, and S4 is a display operation state in the video mode with the scale-up selected. In the drawing, the changes of the control bits DM, RM, RTSON when a display operation state is forced to transition to another display operation state are shown together with arrows each indicating a direction of the transition. The transition forms shown in FIG. 4 are for showing the examples of the desirable transition order. In this embodiment, it is not constrainedly required to follow the transition order by the hardware of the control part 23. For instance, if a direction for direct transition from the state S3 to S4 is provided to the index register 22, the control part 23 never rejects the switching according to the direction, but the normal operation according to the direction is not assured. In short, transitions of states as shown in FIG. 4 are each characterized as a recommended operation transition.

In regard to the recommended operation transitions as shown in FIG. 4, the characteristic transitions involved therein will be described below.

The first is that the display mode is switched from the video mode to the command mode with the current scaling mode maintained. In other words, it is recommended to switch the video mode to the command mode while maintaining the scale-up mode which remains set currently. For instance, between the states S3 and S1, the transition between the video mode and the command mode is performed with the scaling mode which remains unselected; between the states S2 and S4, the transition between the video mode and the command mode is performed with the scaling mode remaining selected.

According to this, the scale-up mode is not changed at the time of switching the mode between the video and command modes and therefore, the risk of a display screen image being distorted can be reduced at this time of point.

The second is that to switch the scale-up mode between the state of being selected and the state of being unselected in the video mode, the step of switching to the command mode is arranged before the step of switching the scale-up mode between the state of being selected and the state of being unselected. Specifically, to cause the transition in display state between the state S3 in which the video mode is specified with the scale-up unselected, and the state S4 in which the video mode is specified with the scale-up selected, it is recommended to perform the transition to the command mode and then to switch the scaling mode in the command mode. That is, the operation of switching the scaling mode between the states S1 and S2 is arranged therebetween as shown in FIG. 4.

According to this, even if the scale-up mode is switched in a condition that the display mode has transitioned to the second display mode, and remains the second display mode, the system never goes into the first display mode in which real-time display is performed. On this account, the distortion of a display screen image at the time of changing the scale-up mode can be reduced.

<<System Operation Modes>>

Figure 5:
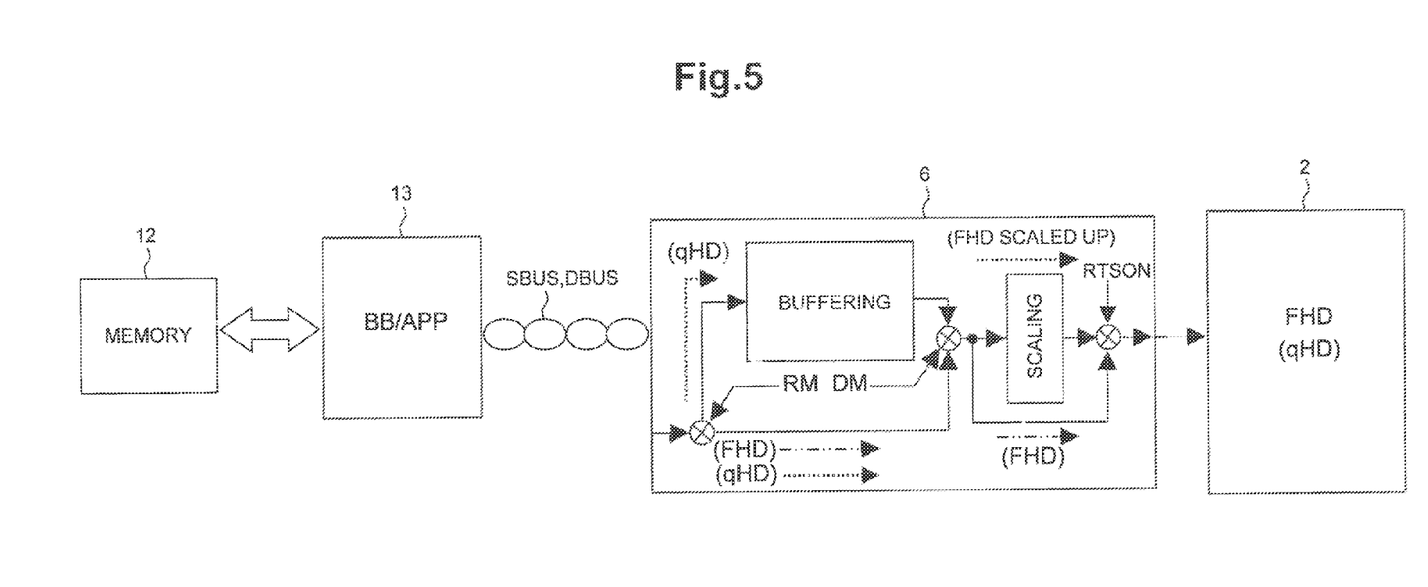
FIG. 5 is an explanatory diagram conceptually showing a flow of display data when the processor part BB/APP processes data while using the video mode and the command mode to perform display control.
Figure 6:
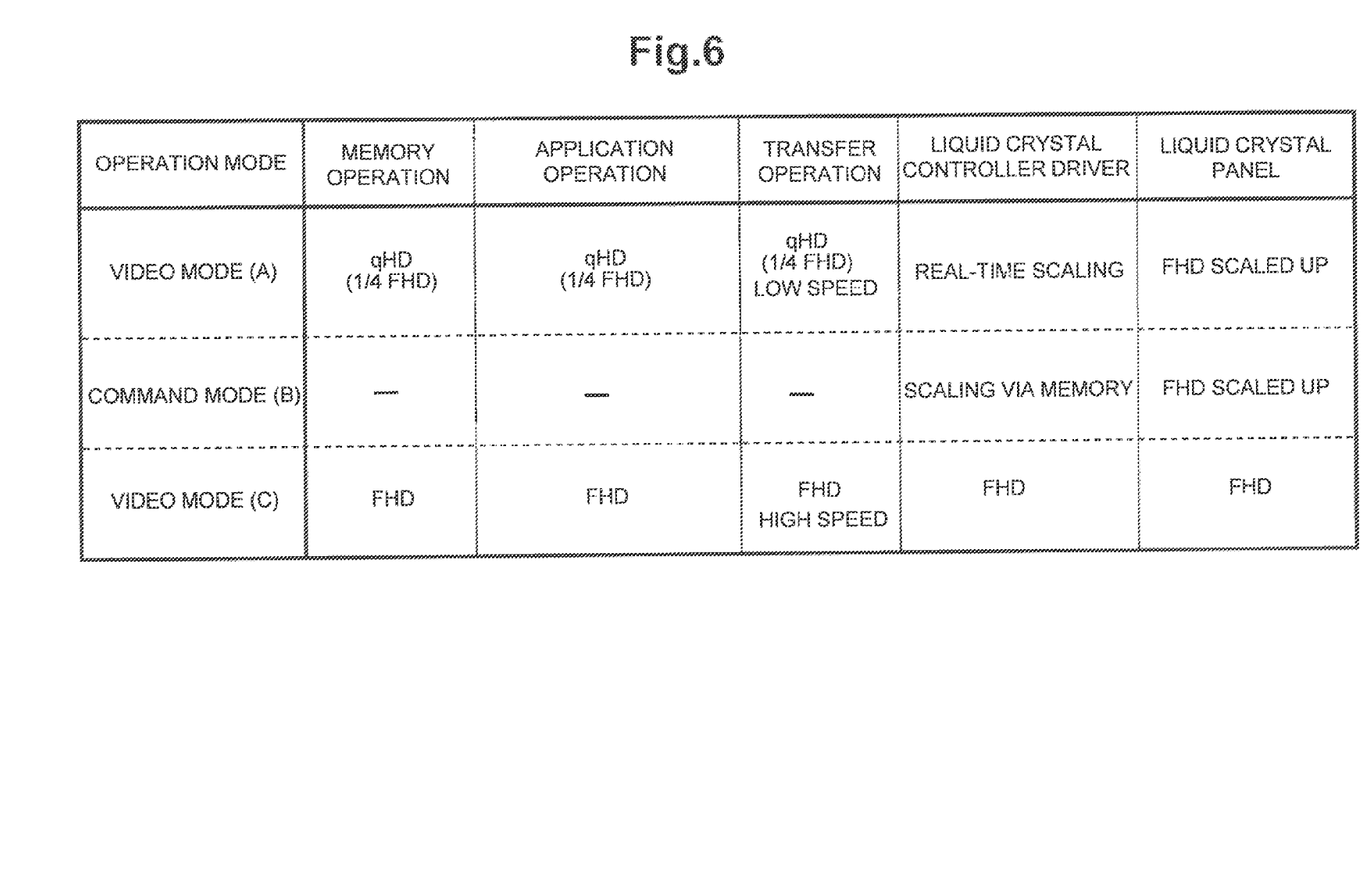
FIG. 6 is an explanatory diagram showing, as an example, an embodiment of the system operation.

Referring to FIGS. 5 and 6, the system operation mode will be exemplified. As shown in FIG. 5, the flow of display data when the processor part BB/APP 13 processes data and in parallel, controls the display using the video mode and the command mode is conceptually shown here. FIG. 6 shows the embodiments of the system operation in this time as examples.

In FIG. 6, in a case that display is performed in the video mode which does not involve the step of scaling up data as in the mode (C), for example, display data targeted for data processing by the processor part BB/APP 13 is as large as FHD size per frame, and as a matter of course, data to be handled in required data access to the memory 12 is as large as FHD size per frame. Also, the data to be transferred on a displaying bus DBUS is as large as FHD size per frame. On receipt of display data having FHD size per frame, the liquid crystal controller driver 6 displays, on the liquid crystal panel 2, the FHD size of display data without scaling up the data.

In contrast, in a case that display is performed in the video mode which involves the step of scaling up data as in the mode as in the mode (A), display data targeted for data processing by the processor part BB/APP 13 may be as large as qHD size per frame adequately, and as a matter of course, data to be handled in required data access to the memory 12 may be as large as qHD size per frame. Also, the data to be transferred on the displaying bus DBUS may be as large as qHD size per frame. On receipt of display data having qHD size per frame, the liquid crystal controller driver 6 scales up image data by real-time scaling (which is to be described later with reference to FIG. 7) from qHD size to FHD size, and displays, on the liquid crystal panel 2, the FHD size of display data. In the mode (C), electric power consumed by the memory operation, the application operation, and the transfer operation can be reduced to a quarter of that consumed in the mode (A) approximately. Therefore, the scale-up mode may be selected for a low-power consumption operation even in the video mode.

In FIG. 6, when the command mode which involves the step of scaling up data as the mode (C) is selected, the liquid crystal controller driver 6 scales up display data of qHD size, whose image has been drawn in the frame memory 28 to FHD size, and displays the resultant FHD size display data on the liquid crystal panel 2. During this operation, the processor part BB/APP 13 may conduct another data process, otherwise draw an image of subsequent display data in the frame memory 28.

Next, embodiments of the control mode in which the processor part BB/APP 13 selects the scale-up will be described.

In the first embodiment, the scale-up is selected according to a battery remaining amount. For instance, the data processing system 1 of FIG. 1 uses a battery (not shown) as an operating power source, MICOM 11 of the processor part BB/APP 13 selects the scale-up mode when the remaining amount of the battery reduces below a predetermined value. This is suitable for the suppression of unexpected cutoff of the power source.

In the second embodiment, the scale-up mode is selected according to a display content. For instance, MICOM 11 of the processor part BB/APP 13 selects the scale-up mode when displaying a menu screen image. This embodiment contributes to the reduction in electric power because the deterioration of image quality caused by the scale-up of a menu screen image is less remarkable than that in the case of a video image.

In the third embodiment, the scale-up mode is selected according to a power mode. For instance, MICOM 11 of the processor part BB/APP 13 selects the scale-up mode when a low-power-consumption mode is set; the low-power-consumption mode enables the working in the condition of low power consumption. According to this, the display control can be rapidly adapted to the low-power consumption condition of the system.

Figure 7:
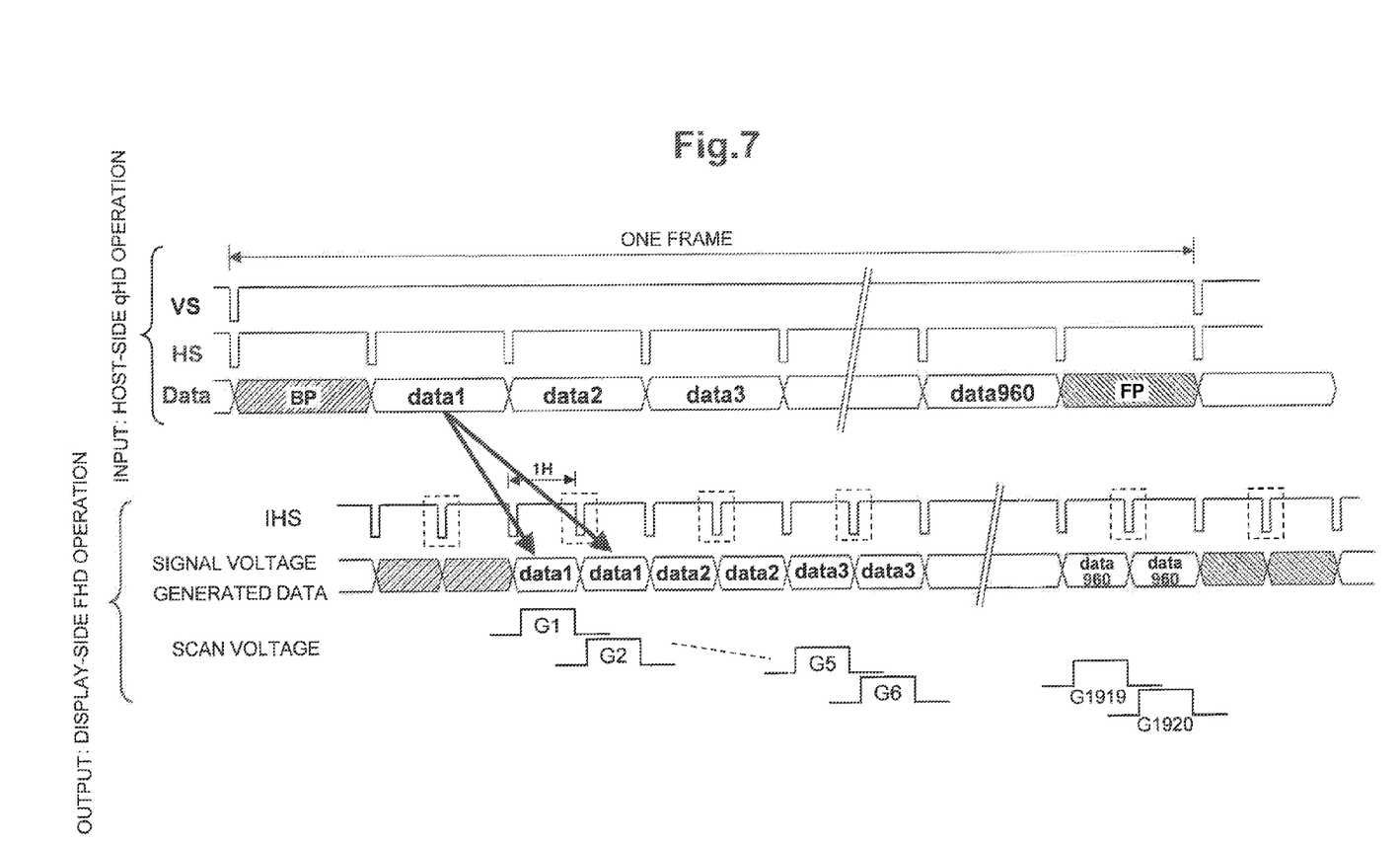
FIG. 7 is a timing diagram, showing, as an example, the operation of real-time scaling.

FIG. 7 shows an example of the operation in real-time scaling. An example of the input to the liquid crystal controller driver 6 is shown as the host-side qHD operation timing, and an example of the output of the liquid crystal controller driver 6 is shown as the display-side FHD operation. In the drawing, "VS" represents a vertical synchronizing signal which is input through the external display interface 21; "HS" represents a horizontal synchronizing signal which is input in the same way; and "Data" represents display data of qHD size, which are input at a rate of 60 Hz per frame. The scaling circuit 31 scales up the input data from qHD size to FHD size according to a method which includes the steps of: doubling the input data by means of copy roughly in units of pixels in horizontal direction; and adding the resultant doubled data in the vertical direction. The input-side data data1 corresponds to a combination of data data1, and the data data1 on the output side, which result from copy of the data data1 in units of pixels in the horizontal direction, and are identical to each other. According to the output of the data data1 and data1, different scan voltages G1, G2, and so on are output. Therefore, the frequency of the horizontal synchronizing signal must be doubled. In the drawing, "IHS" represents a vertical synchronizing signal for FHD size having the double frequency. The horizontal synchronizing signal IHS is output to the liquid crystal panel 2 as an output signal HSOUT of the synchronizing-signal-outputting circuit 40. The vertical synchronizing signal may be the same as the signal VS, which is output to the liquid crystal panel 2 as an output signal VSOUT of the synchronizing-signal-outputting circuit 40.

According to the embodiments described above, the settings of the display mode and the scale-up mode on the index register 22 can be made rewritable depending the type of data to be displayed, the system working situation, user settings, etc. Therefore, the low power consumption allowable in terms of system, and a required display performance can be obtained timely and readily.

The invention is not limited to the above-described embodiments. It is obvious that various changes and modifications thereof may be made within the subject matter thereof.

For instance, the decoder may be a circuit which decodes address information set on the index register as a command, and makes a read access to the control register. The index register, the decoder, and the control register may be substituted with a command register, a command decoder, and a sequencer. Further, in the above-described embodiments, even if a direction for the direct transition from the state S3 of FIG. 4 to the state S4 is provided to the index register 22, the control part 23 never rejects the switching according to the direction, but the normal operation according to such a direction is not assured. To assure the normal operation, it is suffice to adopt a control part operable to reject a display state transition except the state transitions as shown in FIG. 4. The external display interface to which display data are input together with a synchronizing signal is not limited to an RGB interface, and it may be a YUV interface, or another serial graphic interface. The invention is not limited to the application to portable terminal devices including a portable telephone and a smart phone, and it can be widely applied to data processing systems including a relatively large data-processing pad, and a personal computer.

What is claimed is:

1. A display control device comprising:
   a frame RAM configured to store display data for one frame,
   wherein the display control device is operable in a first and a second display mode, and a scale-up mode,
   wherein, in the first display mode, the display control device performs display control of display data supplied together with a display timing signal from outside the display control device,
   wherein, in the second display mode, the display control device performs display control of display data written into the frame RAM without accepting supply of a display timing signal from outside the display control device,
   wherein, in the scale-up mode, the display control device scales up the display data,
   wherein the display control device further comprises
      a register for holding mode data for giving a direction about which of the first and second display modes to select and a direction about whether or not to select the scale-up mode, so that the mode data can be rewritten based on a direction received from outside the display control device; and
      a control part for controlling the display mode and scale-up based on the mode data held by the register,
   wherein on receipt of a direction for switch second display mode during display in the first display node, the control part stores display data of a frame just before the switching in the frame RAM, and then performs a mode transition to the second display mode while using the stored display data to continue the display,
   wherein the control part is arranged to be able to switch the first display mode to the second display mode while maintaining the scale-up mode which remains set currently, and
   wherein when causing a display state to transition between a state in which the first display mode is specified with the scale-up unselected, and a state in which the first display mode is specified with the scale-up selected, the control part causes a transition to the second display mode, and then causes the display state to transition between the states.

2. The display control device according to claim 1, further comprising:
   a first external interface part which is supplied with display data together with a display timing signal from outside the display control device;
   a second interface part which is supplied with display data without supply of a display timing signal from outside the display control device;
   and
   a scaling part for scaling up the display data,
   wherein the control part controls an operation of selecting, as display data to store in the frame RAM, one of display data supplied to the first external interface part, and display data supplied to the second external interface part, controls an operation of selecting, as display data to supply to the scaling part, one of display data output by the first external interface part, and display data output from the frame RAM, and controls an operation of activating the scaling part.

3. A data processing system comprising:
   a processor which executes a program;
   a display control device for performing display control of display data supplied from the processor; and
   a display device for displaying display data supplied from the display control device,
   wherein the display device comprises a frame RAM configured to store display data for one frame and is capable to store the display data supplied from the display control device into the frame RAM and display the display data and is capable to display the display data supplied from the display control device without storing in into the frame RAM,
   wherein the display control device is configured to perform
      a first display mode for performing display control of display data supplied together with a display timing signal from the processor;
      a second display mode for performing display control of display data written into the frame RAM without accepting supply of a display timing signal from the processor; and
      a scale-up mode for scaling up the display data,
   wherein the display control device includes
      a register for holding mode data for giving a direction about which of the first and second display modes to select and a direction about whether or not to select the scale-up mode, so that the mode data can be rewritten based on a direction from outside the display control device; and
      a control part for controlling the display mode and scale-up based on the mode data held by the register,
   wherein on receipt of a direction for switching to the second display mode during display in the first display mode, the control part stores display data of a frame just before the switching in the frame RAM, and then performs a mode transition to the second display mode while using the stored display data to continue the display,
   wherein the control part is arranged to be able to switch the first display mode to the second display mode while maintaining the scale-up mode which remains set currently, and
   wherein when causing a display state to transition between a state in which the first display mode is specified with the scale-up unselected, and a state in which the first display mode is specified with the scale-up selected, the control part causes a transition to the second display mode, and then causes the display state to transition between the states.

* * * * *